May 10, 1960 H. D. SMITH 2,935,966
PORTABLE CHUTE
Filed Sept. 24, 1958 3 Sheets-Sheet 1
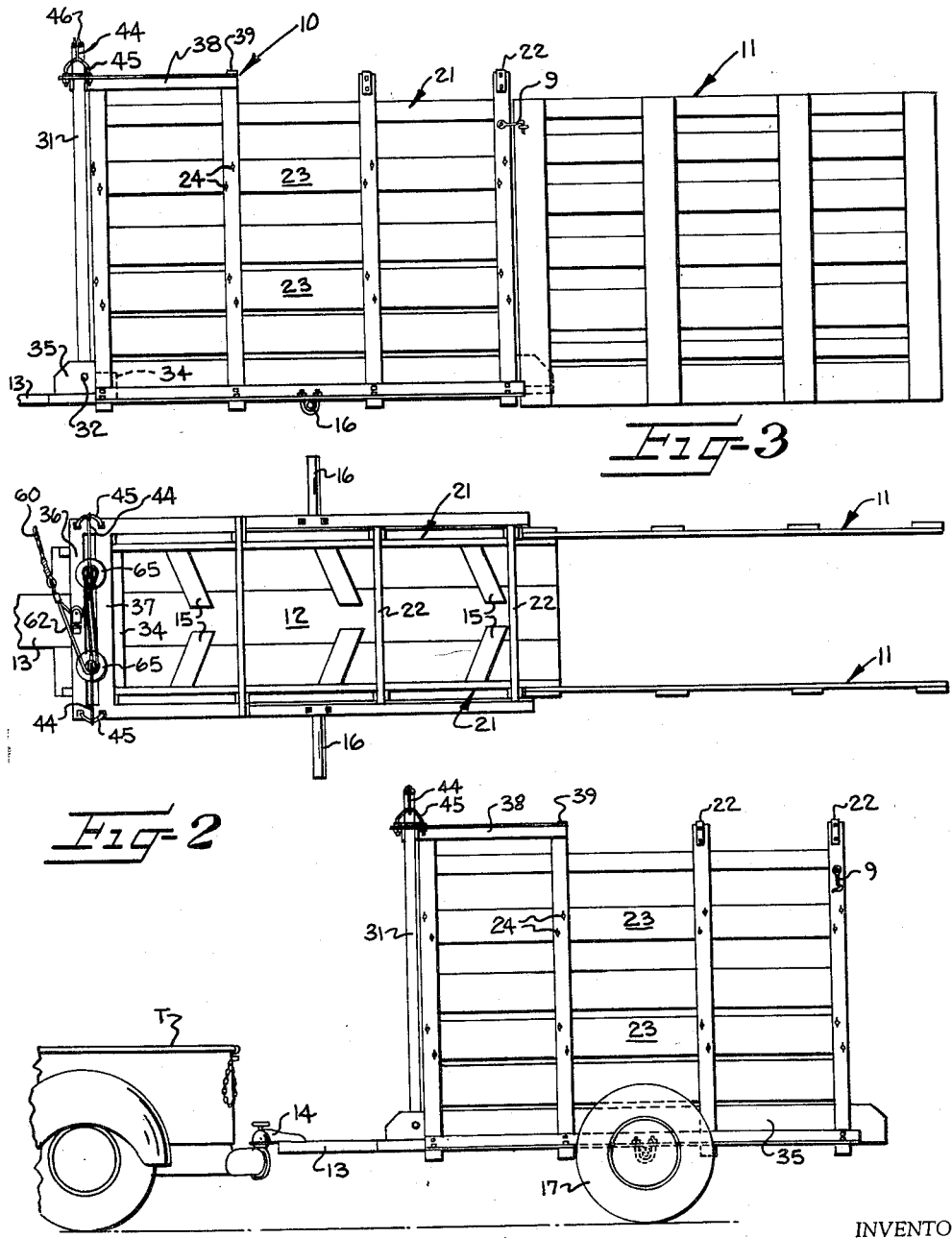

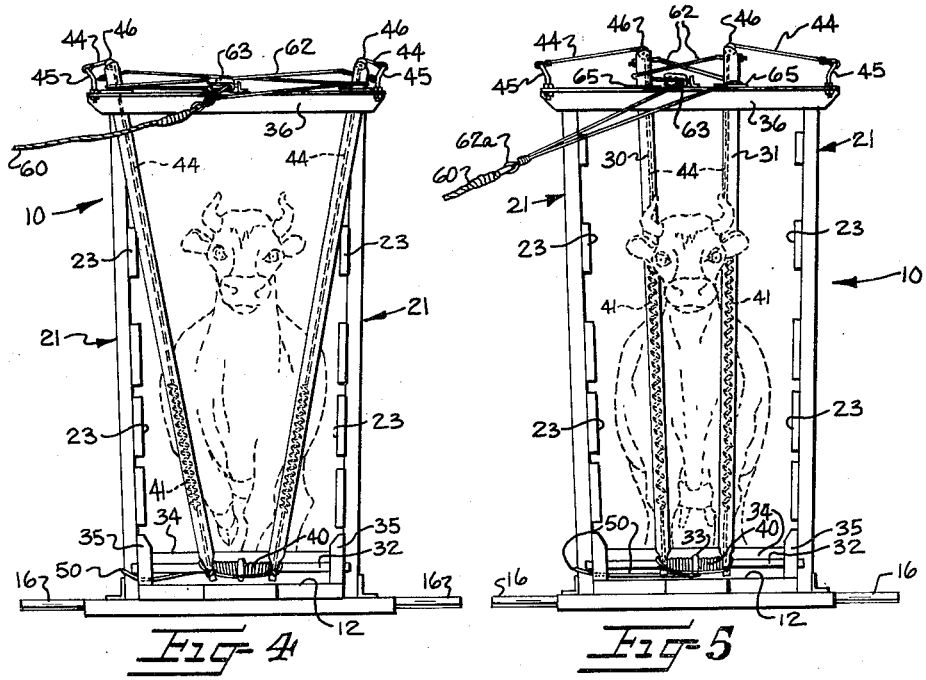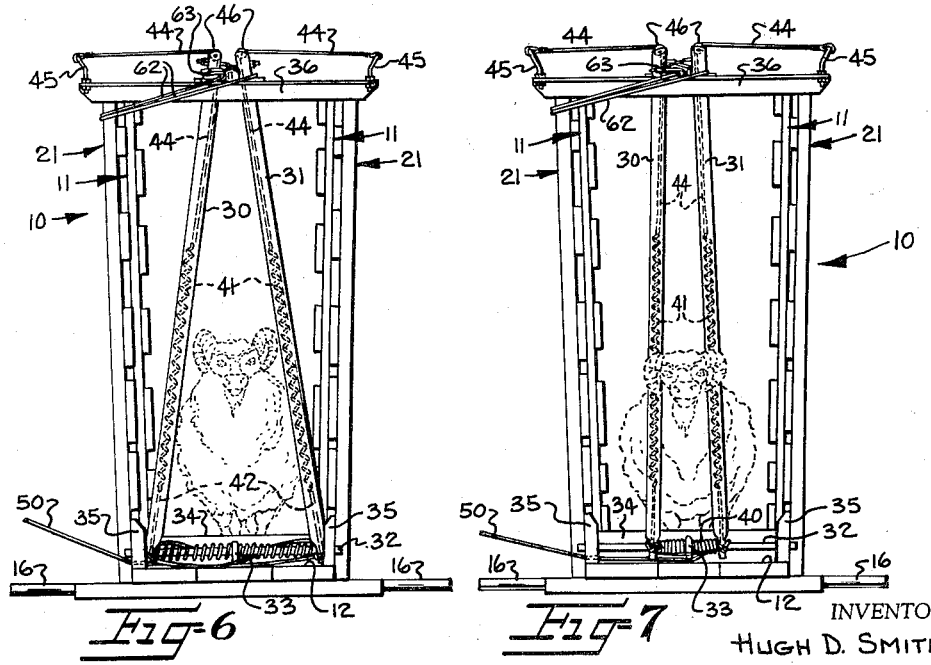

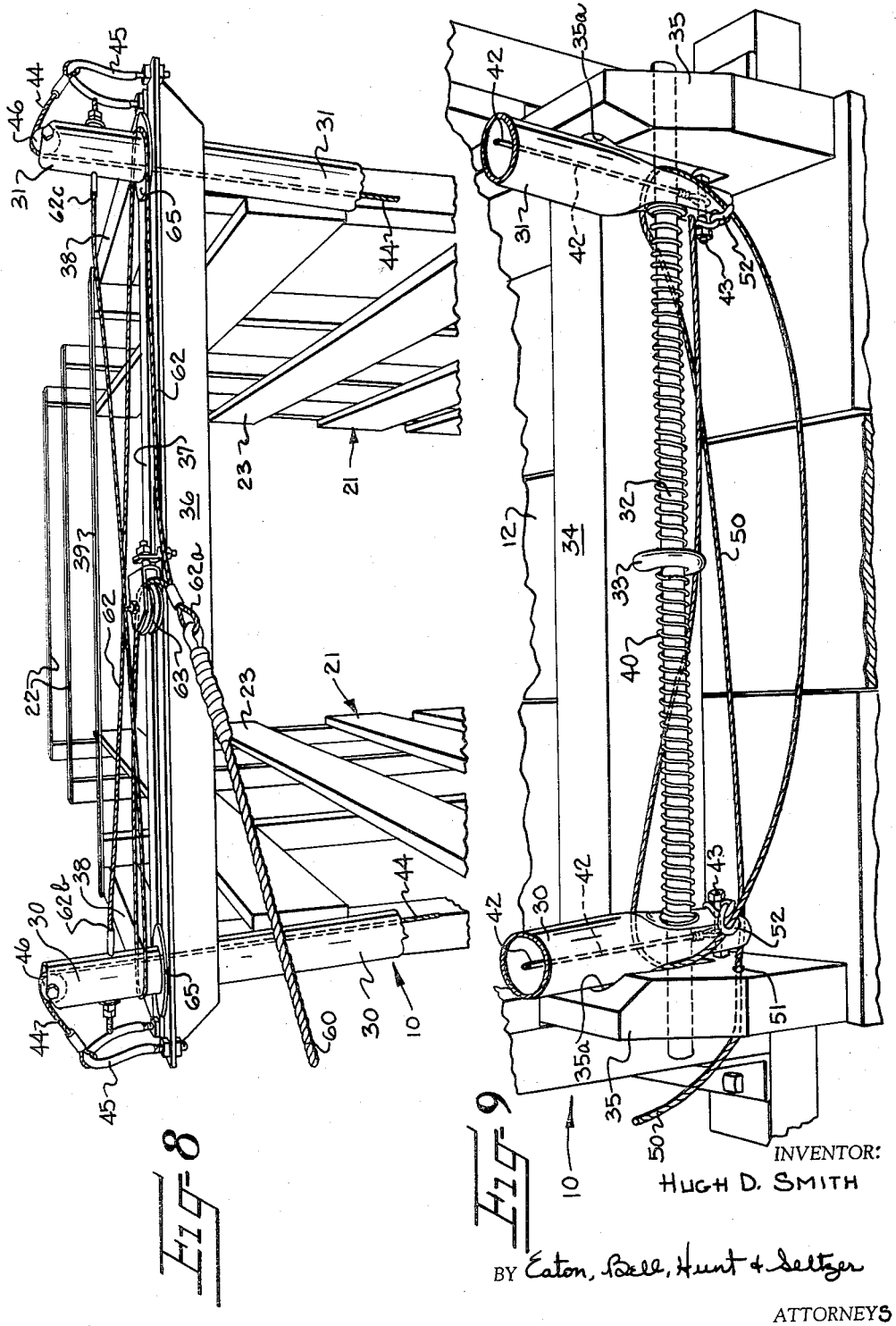

United States Patent Office 2,935,966
Patented May 10, 1960

2,935,966

PORTABLE CHUTE

Hugh D. Smith, Arlington, Va.

Application September 24, 1958, Serial No. 763,120

6 Claims. (Cl. 119—99)

This invention relates to chutes, and more particularly to portable chutes which may be transported from place to place for examining and vaccinating cattle or the like.

The inspecting and vaccinating of herds of animals has always heretofore been a tedious and time consuming operation due mainly to the difficulty of driving the animals into an enclosure and individually holding the animals during the inspecting and/or vaccinating operation. Animals as a group, and particularly range animals, possess an instinctive fear of strangers on the premises. The caretaker can feed and move among his animals with no animal excitement whatsoever. However, as soon as strangers come on the premises animals show fright and will instinctively attempt to get away. If they are in a barn, they will try to leave the barn by the first exit for the pastures or outside concealment of the woods or shrubs. This instinct of animals to move out of the barn when a stranger is present is taken advantage of by the instant invention by providing a portable chute at the exit opening in the barn so that the animals have to pass through the chute in order to leave the barn. However, to entrap the animals in the chute the stanchion or catching bars must be extremely fast of operation or otherwise the animals will pass through thereof without being entrapped. This applies not only to the closing of the stanchion or catch bars but also to the opening thereof.

The front end of the chute, in order for the animals to attempt to escape therethrough, must be so constructed that the maximum of vision is apparent through the chute. Otherwise the animals will not attempt to move therethrough but will continue to mill around inside the barn for example. Furthermore, the operator of the chute must stand back from the same because otherwise the operator will frighten the animals and cause them to hesitate to enter the chute. Animals as a group are generally smart enough to know whether they can get their bodies through an opening or not, therefore the width and depth of an opening is quickly surveyed by animals and if they think there is sufficient room for them to pass therethrough, they will try it if rattling of metal parts or the presence of an operator close to the chute does not frighten them to cause them to stop and back out of the same.

Most of the chutes for entrapping and permitting the inspecting and vaccinating of animals, are so constructed that the front ends of the chutes are not sufficiently open to cause the animals to move into the chute on their own volition. Therefore, it is not at all uncommon today to witness considerable clubbing or whipping of animals as well as electrically shocking the animals in order to drive the animals through chutes. This, of course, is time consuming, aggravating to the veterinarian and of course in many cases produces many unnecessary bruises to the animals. If electricity is used for shocking animals, the animals become so wild, it is virtually impossible to re-corral them for several months. Since tuberculosis and brucellosis infected herds, for example, must be re-tested every thirty to sixty days, it is apparent that the re-test operation is going to be very difficult with these scared animals.

The work of a veterinarian is quite varied with respect to the types of animals that have to be examined and inspected. During any given day, for example, a veterinaian might have to inspect large steers or cattle, small calves and even such small animals as sheep, goats and hogs. Presently there is no chute, other than applicant's available on the market which lends itself for effectively entrapping all sizes of animals from the largest size animal to the smallest.

This application is a continuation in part of my application, Serial Number 583,721, entitled Portable Chute, filed on May 9, 1956. Basically, this application sets forth as the improvement over my prior application the rearrangement of the stanchion operating instrumentalities, particularly a new arrangement of elements for quickly moving the upper and lower ends of the stanchions into closed and open position with a minimum of effort on the part of the operator.

A further improvement of the instant invention comprises, using as an auxiliary chute non-connected side wall portions which when it is necessary to entrap small animals in the main chute, the side walls forming the auxiliary chute may be positioned against the inner walls of the main chute to thus reduce the width thereof to prevent small animals from turning around in the chute and thereby more effectively drive the animals through the chute for the inspecting and/or vaccinating operation.

Therefore, generally the main object of this invention is to provide a chute which will readily accommodate all sizes of animals and which is so constructed that either pair of corresponding ends of the stanchions or animal entrapping upright posts may be moved independently of the other pair of corresponding ends to permit the stanchions to be pre-set as is desired in many cases and as will be explained in detail later, to accommodate various sizes of animals, which in many cases permits one pair of corresponding ends of the stanchions to be maintained in a preset condition and therefore leave only the other pair of corresponding ends of the stanchion to be actuated, which, of course, lends itself to very fast and efficient operation for quickly driving a herd of animals through the chute in a minimum amount of time.

Some of the objects of the invention having been stated, other objects will appear as the description proceeds, when taken in connection with accompanying drawings, in which—

Figure 1 is a side elevational view of the portable chute shown being attached to the rear end of a pick-up truck;

Figure 2 is a top plan view of the portable chute resting on the ground with the wheels removed therefrom and with the auxiliary chute extending rearwardly therefrom;

Figure 3 is a side elevational view of Figure 2 with the chute shown in position for running animals therethrough;

Figure 4 is a front elevational view of the chute showing the big V position of the stanchions for entrapping large animals, for example;

Figure 5 is a view corresponding to Figure 4, but showing the position of the upper ends of the stanchions when entrapping a large animal therebetween;

Figure 6 is a front elevational view showing the inverted V position of the stanchions for receiving small animals such as sheep, for example;

Figure 7 is an elevational view corresponding to Figure 6 and showing the position of the lower ends of the stanchions when entrapping a small animal therebetween;

Figure 8 is an enlarged fragmentary perspective view showing the arrangement of elements for controlling the upper ends of the stanchions; and Figure 9 is an enlarged fragmentary perspective view of the instrumentalities for controlling the movement of the lower ends of the stanchions.

Referring more specifically to the drawings, reference numeral 10 and 11 broadly indicate the main and auxiliary chute, respectively. It should noted that the auxiliary chute is detachably secured to the rear of the main chute as shown in Figure 3 to aid in guiding cattle through the main chute. Suitable means such as hooks 9, only one of which is shown, serve to detachably connect the chutes together.

The main chute 10 is provided with a bottom 12 preferably formed of wood as compared to metal, for example, to lessen the rattling and noise which would, in many cases, frighten the animals as they step thereon. Extending forwardly from the bottom 12 and preferably integral with one of the planks forming the bottom of the chute is an extension or tongue 13 which is provided with suitable hitch means 14 on its forward end for attaching the main chute to a prime mover such as the rear end of a pick-up truck T. Pairs of wooden cleats 15 are suitably secured to the upper surface of the bottom 12 of the chute to provide traction for the animals moving into the chute. Preferably, the cleats 15 are disposed in a rearwardly converging manner in spaced-apart relation to facilitate the cleaning and washing of the bottom of the chute by readily permitting the water and foreign material carried by the water to flow rearwardly along the medial portion of the bottom of the chute between the cleats.

An axle 16 is suitably secured to the underside of the bottom of the chute and wheels 17 are adapted to be received on the free ends of the axle when the chute is in position to be transported. Otherwise, the wheels 17 (only one of which is shown in the drawings) are removed to permit the chute 10 to rest on the ground to permit animals to readily move therethrough during the inspecting and/or vaccinating operation.

The main chute 10 is provided with identical side walls 21, the lower ends of which are suitably secured to the bottom 12 of the chute with the upper ends of the side walls being secured to each other by cross braces 22. As will be observed in Figures 1 and 3 in particular, the sides 21 are formed from spaced-apart boards or planks arranged closer together at the bottom of the sides than at the top thereof to prevent the likelihood of an animal getting his leg caught in the sides of the chute adjacent the bottom. It should be observed (Figures 4 to 7) that the sides 21 are arranged relative to each other in an upwardly diverging manner to thereby readily accommodate all sizes of animals from the smallest animal such as a sheep or pig to the largest animal such as a big steer or a bull while yet permitting the ventral or lower portions of the animal to be as close as possible to the side walls of the chute for ready inspection of the same. To aid in obtaining access to the animal several of the planks or boards forming the side walls of the chute are positioned so as to be readily moved. These planks are identified by numeral 23 in Figure 1 and Figure 3 and it will be noted that suitable means such as wing nuts 24 are provided for readily permitting the removal of these planks for inspecting the lower regions of the animal as well as the back or upper portions of the animal.

The auxiliary chute 11 which comprises identical side wall portions each normally independently detachably secured to the rear end of the main chute 10 by the hooks 9 has the side walls formed in a similar manner as the main chute by spaced-apart planks or boards arranged closer together at the bottom of the side walls than at the upper portions thereof.

Positioned at the front end of the main chute 10 are a pair of hollow upright posts or stanchions 30, 31 mounted for movement toward and away from each other. For supporting the stanchions in an upright manner the lower end of each stanchion 30, 31 is provided with an opening or aperture through which loosely extends a guide shown in the form of a transversely arranged rod 32. The weight of the stanchions is thus supported on the rod 32. The rod 32 is in turn suitably supported by a hook or eye screw 33 at the medial portion thereof, which hook is suitably secured to a cross beam 34 spanning the width of the bottom 12 of the chute. Opposite ends of the rod 32 are supported in longitudinally extending bottom side beams 35 which extend the full length of the chute 10. Each of the longitudinal beams 35 is provided with a recess portion 35a adapted to matingly receive a lower peripheral portion of the stanchions 30, 31, whereby these stanchions may be positioned apart from each other the full interior width of the chute so as to present a completely open end to the front of the chute when desired.

The upper ends of the stanchions 30, 31 are straddled by spaced-apart cross beams 36, 37 preferably in the form of angle irons with proximal surfaces of the cross beams thus defining a guideway or track therebetween for the upper ends of the stanchions. The ends of the transverse members 36, 37 are suitably secured to longitudinally extending members 38 which in turn have their rear ends connected together by a transversely disposed member 39 suitably secured thereto as by welding, for example.

For normally maintaining the lower ends of the stanchions 30, 31 in spread-apart or spaced-apart position, an expansive resilient means shown as a spring 40 is provided which surrounds the rod 32 with opposite ends of the spring 40 bearing against the inner or proximal surface portions of the stanchions.

For normally maintaining the upper ends of the stanchions 30, 31 in spaced-apart or spread-apart position, an expansive resilient means shown as an elongated spring 41 is positioned inside of each stanchion with the lower end of each of the springs being secured to a cable 42 which in turn has a looped lower end secured to a bolt 43 which is suitably secured to the lower end of the stanchion below the rod 32. The upper end of each of the springs 41 is secured to the lower end of a cable 44 which extends upwardly and out of the top end of the stanchion and has its outer end suitably secured to an inverted U-shaped member 45 which in turn has its legs secured to the transverse cross member 36 and longitudinally extending member 38, respectively. To aid the movement of the upper ends of the stanchions 30, 31 relative to each other, against the opposite pulling force exerted by the springs 41, a guide pulley 46 is suitably mounted in the upper end of each stanchion to reduce the frictional drag of the cable 44 extending therefrom when the stanchions are being moved. In this respect it should also be noted that the inverted U-shaped members 45 are of sufficient height to facilitate and obtain a straighter pull on the upper ends of the stanchions 30, 31 under the action of the springs 41.

Independently operable means are provided for moving corresponding pairs of stanchion ends relative to each other. For moving the lower ends of the stanchions relative to each other, a cable 50 (Figure 9) is provided which has one end secured to the lower end of the stanchion 31 and extending outwardly therefrom underneath the hook 33 and around the lower portion of the opposite stanchion 30 above the rod 40 and then around the lower end of the stanchion 31 above the rod 40 and from there the cable extends below the rod 32 and through an opening 51 in the longitudinal member 35 to one side of the chute. It should thus be noted that the particular looping arrangement of the cable 50 relative to the lower ends of the stanchions 30 and 31 and the rod 40 positions the cable in such a manner that the medial portions or runs of the same, that is those portions which span the distance between the stanchions, are held underneath the rod 32 to thus prevent the likelihood of animals tripping over the same. To further aid in holding the runs of the cable downwardly and to prevent them from bowing upwardly and tripping the animals, short lengths of chain 52 are provided through which extends the foremost run of the cable as viewed in Figure 9. These short lengths of chain 52 are connected to the lower ends of the stanchions below the rod 40 by the bolts 43 which, as stated before, also serve to hold the lower ends of the cables 42 positioned inside the stanchions.

It should also be noted that the particular arrangement of the cable 50 relative to the stanchions 30, 31 gives a mechanical advantage of 3. Stated otherwise, for every pound of force exerted on the outward free end of the cable 50, three times that much force is exerted on each of the stanchions 30 and 31. This enables an operator to quickly move the lower ends of the stanchions together with a minimum amount of effort for quickly entrapping an animal. Also, as is apparent by having this mechanical advantage, it is almost impossible for an animal to use his brute strength to move the stanchions apart from each other by overcoming the force exerted by the operator on the end of the cable 50. Of course, normally the end of the cable 50 is secured to a short length of chain (not shown), so that after the cable 50 in pulled to move the lower ends of the stanchions together, one link of the chain is connected to a hook or nail on the side of the chute for holding the cable 50 in the desired position for maintaining the stanchions in the closed position while the animal is being inspected and/or vaccinated.

For moving the upper ends of the stanchions relative to each other independently of movement of the lower ends of the stanchions, a rope or cable 60 is provided which although not shown would preferably have its outer end also connected to a short chain which in turn would be secured to a hook or nail or the like on the side of the chute for maintaining the rope 60 in the desired position when the stanchions had been moved inwardly for entrapping an animal. The inner end of the rope 60 is secured to a loop portion 62a of a cable 62. Opposite ends 62b, 62c of the cable 62 are connected to the upper ends of the stanchions 30, 31, respectively, by any suitable means such as bolts or the like. A pulley 63 is suitably secured to a medial portion of the cross member 36 and serves to receive and guide one run of the cable 62 during movement of the upper ends of the stanchions. Also the pulley 63 indirectly serves to guide the run of the cable corresponding to the run passing therethrough since the cable 62 is uniformly controlled by application of force to the rope 60 connected thereto.

Referring now particularly to Figure 8, a detailed description will now be given of the arrangement of the runs of the cable 62 for obtaining a mechanical advantage of 6. Starting from the loop 62a of the cable 62 it will be noted that one run of the cable passes through the pulley 63 and then encircles the upper end of the stanchion 30 and from there crosses over to the stanchion 31 where the free end 62c is suitably connected, as explained before. Now, the other portion of the cable, starting from the loop 62a, passes outside of the pulley 63 but adjacent thereto and around the upper end of the stanchion 31 and thence crosses over to the stanchion 30 where the free end 62a is suitably connected. Thus, a mechanical advantage of 6 is obtained by the particular arrangement of the runs of the cable 62 which mechanical advantage permits the upper ends of the stanchions to be moved inwardly toward each other very quickly with a minimum of effort and ensures that the engaged animal can readily be held therebetween and not break free of the stanchions by overcoming the pulling force exerted on the rope 60. To prevent the bights or loops of the cable 62 which engage the stanchions 30, 31 from sliding down the length of the stanchions and interfering with the movement of the stanchions in the trackway defined by the cross members 36, 37, annular plates 65 loosely surround the upper end of each of the stanchions with the plates having a sufficient diameter to normally rest upon the cross members 36, 37 to thus serve as blocks or stops for preventing the cable 62 from sliding downwardly into the trackway.

*Operation of the chute*

Referring now to Figures 4 and 5 in particular, Figure 4 shows an arrangement of stanchions for receiving medium or large size animals. It should be particularly noted that the stanchions are arranged to form a big V. This arrangement is due to having the upper ends of the stanchions in their fully spread-apart or retracted position but having the lower ends of the stanchions moved inwardly toward each other to compress the spring 44 surrounding the shaft 32. The lower ends of the stanchions may be pre-set and secured in this position, thus making it possible to rapidly move animals through the chute since only the upper ends of the stanchions need to be actuated. It has been proven in the field that this position works very effectively for medium and large size animals since animals are led to believe that the opening is sufficiently large for them to move therethrough merely by a slight jump through the big V. However, as soon as an animal's neck is positioned between the stanchions the rops 60 is then jerked to move the upper ends of the stanchions together to the position shown in Figure 5 to thus entrap the animal, after which the animal is inspected and/or vaccinated and then quickly released by releasing the rope 60 which permits the springs 41 to quickly return the upper ends of the stanchions to the ready position for receiving a successive animal as shown in Figure 4.

Referring now to Figures 6 and 7, these two views respectively illustrate the pre-set position of the stanchions and the entrapping position of the stanchions for engaging small animals such as sheep, goats, hogs, and the like. It should be noted that the auxiliary guide chute 11 has been positioned inside of the main chute 10 for handling these small animals. This lessens the likelihood of the small animals turning around in the chute as otherwise they readily could do in many cases in the absence of having the reduced interior width as accomplished by the auxiliary chute 11.

Figure 6 represents the pre-set position of the stanchions 30, 31 prior to the small animal being engaged therebetween. It should be particularly noted that the upper ends of the stanchions have been moved inwardly with respect to each other as far as possible to thus form a big inverted V. The rope 60 is suitably secured to the side of the chute, as explained before, to hold the upper ends of the stanchions in this preset position. Now, in running small animals through the chute only the cable 50 controlling the movement of the lower ends of the stanchions has to be operated. The engaging position of the stanchions for small animals is shown in Figure 7.

This pre-set relationship of the upper ends of the stanchions as shown in Figure 6 has proven to be very effective for fast examination and/or vaccination of small animals. Since the small animals are naturally lower to the ground and their vision is nearer to the ground or floor, they are prone to think that they can readily move through the front end of the chute when viewing the same as shown in Figure 6 since they do not foresee any obstruction to their moving therefrom. However, as is apparent upon the neck portion of the animal being straddled by the stanchions, the cable 50 is quickly operated to tightly engage the animal and hold the animal in the chute until the examination and/or vaccination is completed.

In the event an animal is running very fast in the chute, it is desirable to slow the animal down to prevent the bruising of its neck and shoulders when it engages the upright stanchions. This is readily accomplished by waving the stanchions by imparting short jerks to the rope 60 in Figure 4, as in the case of large animals, or the cable 50 in Figure 6, as in the case of smaller animals. This makes the stanchions wave inward and outward a slight amount. Animals note with instinctive perception anything that moves or stirs. Therefore, they instinctively slow down, thus eliminating any lunging action when engaging the stanchions and thereby avoiding the likelihood of bruises and injury to themselves.

It is thus seen that there has been disclosed a portable chute wherein the stanchions for engaging the animals are arranged to permit the pairs of corresponding ends to be independently operated to thereby permit the stanchions to be pre-set into a big V position for handling medium size and large size animals or pre-set into an inverted V position for quickly handling small size animals. The means for moving corresponding ends of the stanchions is arranged to obtain a high mechanical advantage for quick efficient operation and the means for returning the corresponding ends of the stanchions to a spread-apart position is so arranged that a quick snap-like action is obtained to thereby prevent the likelihood of the successive animal passing through the chute without being engaged since the parts are quickly returned in readiness for the next engaging operation.

In the drawings and specification there have been set forth a preferred embodiment of the invention and, although specific terms are employed, they are used in a generic and descriptive sense only, and not for purposes of limitation, the scope of the invention being defined in claims.

I claim:

1. In a chute having opposed side walls and means positioned adjacent one end of the chute for restraining the passage of animals therefrom, said means comprising a pair of hollow upright stanchions normally positioned in spaced-apart relation against the side walls of the chute, a rod having its opposite ends secured to the chute and loosely penetrating the lower ends of said stanchions and slidably supporting the stanchions thereon, a spring encircling said rod and having its opposite ends bearing against the proximal surfaces of the lower ends of said stanchions for normally maintaining the lower ends of said stanchions in spaced-apart relation, elongated resilient means positioned inside of each of said stanchions with the lower ends of each of the resilient means being anchored to the lower ends of the stanchions and the upper ends of the resilient means being secured to the sides of the chute, means secured to the upper side walls of the chute and straddling the upper ends of said stanchions and serving as a trackway for guiding the upper ends of the stanchions when the same are moved relative to each other, and independently operable separate cables connected to each pair of corresponding ends of said stanchions whereby either pair of ends of the stanchions may be moved relative to each other independently of the other pair of ends, and wherein the cables are connected to the stanchions in such a manner as to obtain a high mechanical advantage for readily moving the stanchions toward each other.

2. An animal restraining device having spaced-apart sides, a pair of upright stanchions normally positioned in spaced relation adjacent said sides, a rod having its opposite ends secured to said sides and loosely penetrating the lower end portions of said stanchions and serving to slidably support the stanchions thereon for movement relative to each other, a spring encircling said rod with opposite ends of the spring engaging the proximal surfaces of the lower ends of the stanchions for normally maintaining the stanchions in spaced-apart relation, means secured to the upper portions of said sides and straddling the upper ends of said stanchions and defining a trackway therebetween to serve as a guide for the upper ends of said stanchions during movement thereof, resilient means connected to the upper ends of each of the stanchions for normally maintaining the upper ends of the stanchions adjacent said sides independently of the position of the lower ends of said stanchions, a cable connecting the upper ends of said stanchions together, one end of the cable being fixedly connected to one stanchion, the other end of said cable being fixedly connected to the other stanchion, the reach of the cable extending from each end of the cable being looped around the opposite stanchion and engaging the upper outer surface portions thereof, a pulley positioned on a medial portion of said means defining the trackway for the upper ends of the stanchions, the reach of the cable extending from around one stanchion being guided by said pulley whereby upon an outward pull being exerted on the cable portion guided by said pulley, the upper ends of the stanchions will move toward each other at the same rate of speed and with a high mechanical advantage, and a second cable connecting the lower ends of said stanchions and having looped portions therein engaging the outer surface portions of the lower ends of the stanchions whereby a pull exerted on the cable will cause the lower ends of the stanchions to move toward each other independently of movement of the upper ends of the stanchions and with a mechanical advantage.

3. An open-ended chute having a bottom and spaced-apart upwardly diverging side walls, a pair of hollow upright stanchions positioned adjacent one end of said chute for engaging the neck portion of an animal passing therethrough, a rod loosely penetrating the lower end portions of said stanchions and having its opposite ends secured to the chute and serving to supportingly guide the lower ends of said stanchions, said rod being positioned in spaced relation to the bottom of the chute to maintain the lower ends of said stanchions out of engagement with the bottom of the chute, a spring surrounding said rod and positioned between said stanchions for normally maintaining the lower ends of the stanchions in spaced-apart relation against the side walls of the chute, means secured to the upper portions of the side walls of the chute and straddling the upper ends of said stanchions for guiding the upper ends of the stanchions during movement thereof, an elongated resilient member positioned inside of each stanchion, the lower end of each resilient member being connected to the lower end of the stanchion, a cable connected to the upper end of each resilient member and extending upwardly through the stanchion and out of the upper end thereof and being connected to the sides of the chute, said resilient members being under sufficient tension to normally maintain the upper ends of the stanchions in spaced-apart relation against the side walls of the chute, and a pulley positioned in the upper end of each stanchion for guiding the cable passing therefrom, and independently operable means connecting the corresponding pairs of upper and lower ends of said stanchions for moving the pairs of ends independently of each other.

4. In a chute according to claim 3 wherein means are provided adjacent the upper ends of the stanchions for securing the cable connected to said resilient means at a height substantially on level with the pulleys mounted in the upper ends of the stanchions for causing said resilient means in the stanchions to exert a substantially straight pull on the upper ends of the stanchions.

5. An animal restraining device comprising a pair of generally upright stanchions, a supporting frame therefor including upper and lower guides operatively associated respectively with the upper and lower portions of said stanchions, expansive resilient means operatively associated with opposed portions of said stanchions for normally urging the same apart, and pliable stanchion operating elements independently operatively associated with upper and lower portions respectively of said stanchions to independently pull the same toward each other to engage the neck of an animal, said pliable stanchion operating elements comprising a cable connecting the upper ends of said stanchions together, opposite ends of said cable being fixedly connected to the upper ends of the respective stanchions, the reach of the cable extending from each end thereof being looped around the opposite stanchion from which the cable is connected and engaging the upper outer surface portions of the opposite stanchion, a pulley positioned on a medial portion of said upper guide and the reach of the cable extending from around one stanchion engaging said pulley and being guided thereby, whereby upon an outward pull being exerted on the cable portion guided by said pulley, the upper ends of the stanchions will move toward each other at the same rate of speed and with a high mechanical advantage.

6. In an animal restraining device according to claim 5 wherein said pliable stanchion operating elements comprise a second cable connecting the lower ends of said stanchions and having looped portions therein engaging the outer surface portions of the lower ends of the stanchions whereby a pull exerted on the cable will cause the lower ends of the stanchions to move toward each other with a mechanical advantage.

References Cited in the file of this patent

UNITED STATES PATENTS

| | | |
|---|---|---|
| 2,408,872 | Newbold | Oct. 8, 1946 |
| 2,571,487 | Rolfe et al. | Oct. 16, 1951 |
| 2,764,129 | Haggard | Sept. 25, 1956 |